United States Patent
Arora et al.

(10) Patent No.: US 10,474,211 B2
(45) Date of Patent: Nov. 12, 2019

(54) METHOD FOR DYNAMIC ARBITRATION OF REAL-TIME STREAMS IN THE MULTI-CLIENT SYSTEMS

(71) Applicant: Advanced Micro Devices, Inc., Santa Clara, CA (US)

(72) Inventors: Sonu Arora, Bangalore (IN); Alexander Branover, Chestnut Hill, MA (US); Benjamin Tsien, Fremont, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 174 days.

(21) Appl. No.: 15/663,464

(22) Filed: Jul. 28, 2017

(65) Prior Publication Data

US 2019/0033939 A1   Jan. 31, 2019

(51) Int. Cl.
    G06F 1/00    (2006.01)
    G06F 1/26    (2006.01)
    G06F 13/16   (2006.01)

(52) U.S. Cl.
    CPC .......... G06F 1/266 (2013.01); G06F 13/1673 (2013.01)

(58) Field of Classification Search
    CPC ....................................................... G06F 1/266
    See application file for complete search history.

(56) References Cited

U.S. PATENT DOCUMENTS

| | | | |
|---|---|---|---|
| 6,084,856 A | 7/2000 | Simmons et al. | |
| 9,003,413 B1 * | 4/2015 | Anderson | G06F 9/52 718/102 |
| 9,075,609 B2 | 7/2015 | Bircher et al. | |
| 9,329,666 B2 | 5/2016 | Shippy | |
| 9,360,918 B2 | 6/2016 | Manne et al. | |
| 2004/0264396 A1 | 12/2004 | Ginzburg et al. | |
| 2006/0253675 A1 | 11/2006 | Johannes Bloks | |
| 2009/0077401 A1 | 3/2009 | Tsai, Jr. | |
| 2009/0116503 A1 * | 5/2009 | Sebastian | H04L 47/10 370/412 |

(Continued)

FOREIGN PATENT DOCUMENTS

KR   102013003068 A   3/2013

OTHER PUBLICATIONS

International Search Report and Written Opinion for International Application No. PCT/US2018/043131, dated Nov. 12, 2018, 22 pages.

*Primary Examiner* — Mohammed H Rehman
(74) *Attorney, Agent, or Firm* — Polansky & Associates, P.L.L.C.; Paul J. Polansky; Rosalynn M. Smith

(57) ABSTRACT

A data processing system includes a power manager for providing a power event depth signal in response to a power event request signal. A plurality of real-time clients is coupled to the power manager. Each real-time client includes a client buffer that has a plurality of entries for storing data. The real-time client also includes a register for storing a watermark threshold for the client buffer, as well as logic for providing an allow signal when a number of valid entries in the client buffer exceeds the watermark threshold. A power management state machine is coupled to each of the plurality of real-time clients. The power management state machine provides a power event start signal in response to all of the plurality of real-time clients providing respective allow signals.

31 Claims, 6 Drawing Sheets

(56) References Cited

U.S. PATENT DOCUMENTS

| | | | |
|---|---|---|---|
| 2010/0229012 A1* | 9/2010 | Gaskins | G06F 1/3203 |
| | | | 713/322 |
| 2010/0275046 A1* | 10/2010 | Shimazaki | G06F 1/3203 |
| | | | 713/323 |
| 2014/0298125 A1* | 10/2014 | Devadze | G06F 11/26 |
| | | | 714/726 |
| 2015/0067356 A1 | 3/2015 | Trichy Ravi et al. | |
| 2016/0091957 A1 | 3/2016 | Partiwala et al. | |
| 2018/0004670 A1* | 1/2018 | Sudhir | G06F 12/0862 |

* cited by examiner

METHOD FOR DYNAMIC ARBITRATION OF REAL-TIME STREAMS IN THE MULTI-CLIENT SYSTEMS

BACKGROUND

Computer systems utilize peripheral components to increase functionality during the computing experience. A system on a chip (SoC) provides control for a number of peripheral devices. For example, a display, camera, and multiple media engines, to name a few, are real-time clients that connect as peripheral components to the SoC and enable the input and output of information to and from the computer system. Real-time clients are key components of most computer systems, adding value to a user's daily computing experience. However, many real-time clients are sensitive to excessive latency resulting in user visible effects when the bandwidth and latency demand is not met.

For power saving purposes, SoC interconnects may execute multiple performance and low power states as well as place external memory components in low power states. Additionally, some SoCs enable periodic retraining of memory. These power management and memory retraining events increase time delays, resulting in the memory interface being unavailable for 10 s of microseconds. For some real-time clients, during peak latency periods, these interruptions can result in frame drops, which are apparent to the end user.

SoCs continue to increase in the number of connected real-time clients. The real-time clients compete for bandwidth of shared resources during power management and retraining events. The inability and/or restrictions to successfully manage a system's bandwidth and latency during power management and memory retraining events compromises the quality of service of a computing system.

Figure 1:
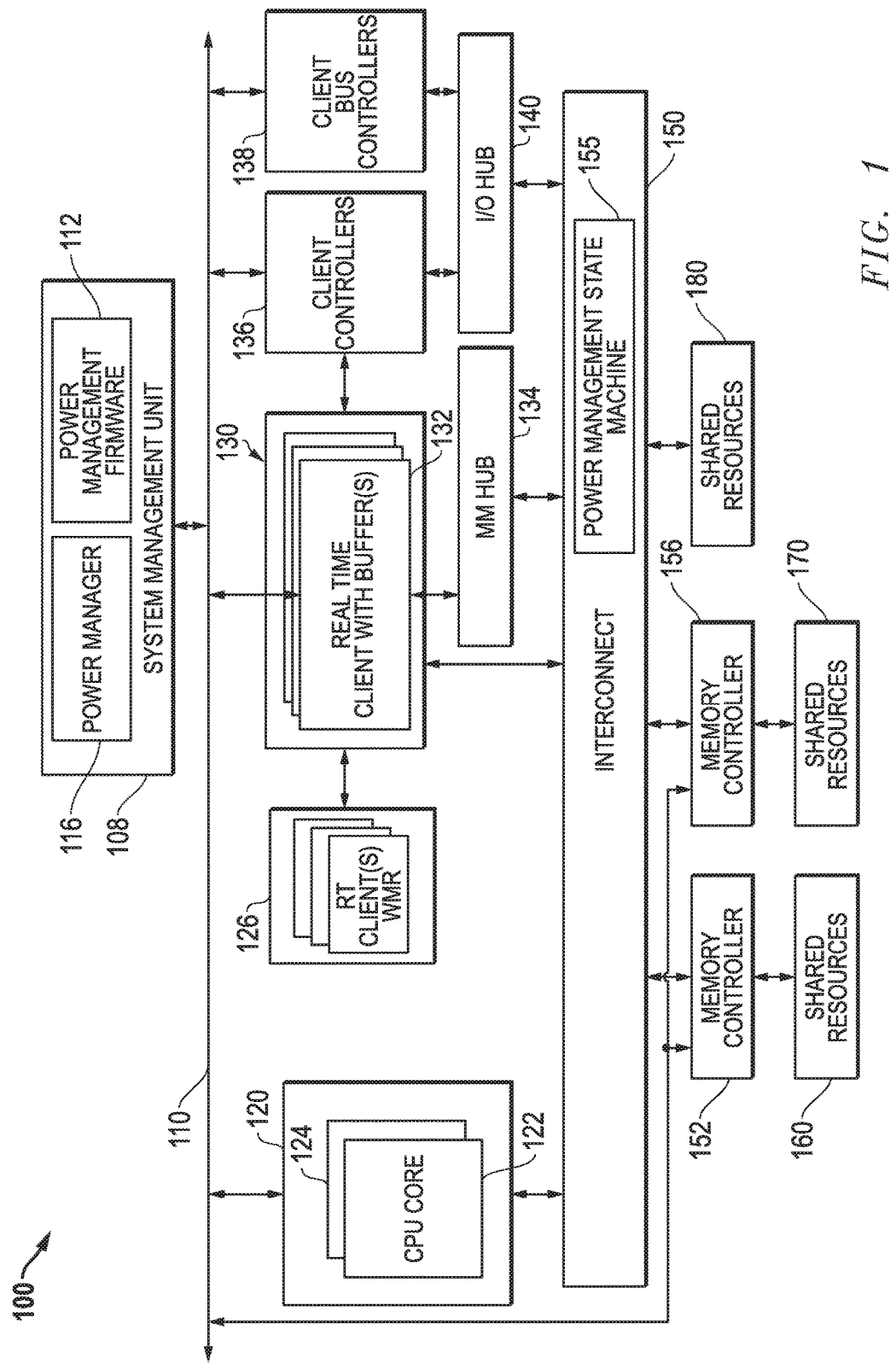
FIG. 1 illustrates in block diagram form an accelerated processing unit (APU) suitable for use in a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below in one form, a data processing system includes a power manager for providing a power event depth signal in response to a power event request signal. A plurality of real-time clients is coupled to the power manager. Each real-time client includes a client buffer that has a plurality of entries for storing data. The real-time client also includes a register for storing a watermark threshold for the client buffer, as well as logic for providing an allow signal when a number of valid entries in the client buffer exceeds the watermark threshold. A power management state machine is coupled to each of the plurality of real-time clients. The power management state machine provides a power event start signal in response to all of the plurality of real-time clients providing respective allow signals.

In another form a data processing system includes a power management state machine, a power manager coupled to the power management state machine for receiving a power event request, and a plurality of real-time clients coupled to the power management state machine and to the power manager for receiving a depth of a power event. The plurality of real-time clients is adapted to dynamically configure a bandwidth of a watermark register in correspondence to the depth of the power event. The plurality of real-time clients compare a number of entries in a client buffer associated with the watermark register to a value of the watermark register, and determines if the power event request is an allowable request. In response to determining the power event request is an allowable request, the plurality of real-time clients asserts an allow signal to enable commencement of the power event.

In yet another form, there is described a method for dynamically managing clients during real-time power events for shared resources. A power event request is received, and in response to receiving the power event request a watermark threshold is determined for each client associated with the power event request. For each client, a number of entries in a client buffer are compared to a respective watermark threshold. At least one of an allowance signal and a non-allowance signal is detected. In response to detecting an allowance signal from each client associated with the power event request, a power event is enabled to commence. In response to detecting at least one non-allowance signal from at least one client associated with the power event request, the power event is disabled from commencing.

FIG. 1 illustrates in block diagram form an accelerated processing unit (APU) 100. APU 100 is suitable for use in a data processing system. APU 100 includes generally a central processing unit (CPU) core complex 120, a set of watermark registers 126, real-time clients 130, a memory management hub 134 (or multi-media hub, in some embodiments), an interconnect 150, client controllers 136, client bus controllers 138, an input/output hub 140, a system management unit (SMU) 108, a system management network bus 110, a set of memory controllers 152 and 156, and a number of shared resources 160, 170, and 180 which are typically associated with shared memory channels or input/output interfaces/links.

CPU core complex 120 includes a CPU core 122 and a CPU core 124. In this example, CPU core complex 120 includes two CPU cores, but in other embodiments CPU core complex 120 can include an arbitrary number of CPU cores. Each of CPU cores 122 and 124 is bidirectionally connected to a system management network (SMN), which forms a control fabric, and to interconnect 150, and is capable of providing memory access requests to interconnect 150. Each of CPU cores 122 and 124 may be unitary cores, or may further be a core complex with two or more unitary cores sharing certain resources such as caches.

Set of real-time clients 130 include real-time client with buffer(s) 132. Real-time client with buffer(s) 132 include read client buffers and/or write client buffers. A read client buffer is useful for example for multi-media controllers and a display engine(s). The read client buffer stores reads from memory. A write client buffer is useful with RT clients such as a display wireless engine, multi-media engine, a camera controller, and a graphics processing unit. A write client buffer typically sends data that will be stored in memory. Real-time client with buffer(s) 132 is bidirectionally connected to a common memory management hub 134 for uniform translation into appropriate addresses in a memory system, and memory management hub 134 is bidirectionally connected to interconnect 150 for generating memory accesses and receiving read data returned from the memory system. Real-time client with buffer(s) 132 is also bidirectionally connected to SMN 110 and to interconnect 150. Additionally, the buffer(s) of real-time client with buffer(s) 132 is capable of providing or receiving data for memory access requests to or from interconnect 150 through memory management hub 134. In this regard, APU 100 may either support a unified memory architecture in which CPU core complex 120 and real-time client with buffer(s) 132 share the same access to memory, the same memory space, or a portion of the memory space.

Watermark registers 126 are dynamically configurable watermark registers added per real-time client buffer. Each of watermark registers 126 is connected to a corresponding client buffer of real-time clients 130, and provide real-time watermark levels corresponding to real-time power management events.

Interconnect 150 includes power management state machine 155. Power management state machine 155 receives real-time client watermark level status per power event request, and selectively generates a power event request to a shared resource in system 100, such as shared memory. Additionally, interconnect 150 includes a crossbar switch for routing memory access requests and memory responses between any memory accessing agent and memory controllers 152 and 156. Interconnect 150 also includes a system memory map, defined by BIOS, for determining destinations of memory accesses based on the system configuration, as well as buffers for each virtual connection. In an alternate embodiment, power management state machine 155 and interconnect 150 are separate.

Client controllers 136 include, for example, a USB controller, a Serial Advanced Technology Attachment (SATA) interface controller, and a solid-state drive (SSD) controller, each of which is bidirectionally connected to a system hub 140 and to SMN bus 110. These two controllers are merely exemplary of peripheral controllers that may be used in APU 100.

Client bus controllers 138 are peripheral controllers that may include a system controller and a PCIe controller. Client bus controllers 138 are bidirectionally connected to input/output (I/O) hub 140 and to the SMN bus 110. I/O hub 140 is also bidirectionally connected to interconnect 150. Thus, for example, CPU core 122 can program registers in each client controller associated with client controller 136 through accesses that interconnect 150 routes through I/O hub 140.

SMU 108 is a local controller that controls the operation of the resources on APU 100 and synchronizes communication among them. SMU 108 includes power manager 116 and power management firmware 112. SMU 108 manages power-up sequencing of the various processors on APU 100 and controls multiple off-chip devices via reset, enable and other signals. SMU 108 includes one or more clock sources not shown in FIG. 1, such as a phase locked loop (PLL), to provide clock signals for each of the components of APU 100. Power manager 116 manages power for the various processors, real-time clients, and other functional blocks, and may receive measured power consumption values from CPU cores 122 and 124 and core complex 120 to determine appropriate power states. Power management firmware 112 is bidirectionally connected to real-time watermark registers 126. Power management firmware 112 dynamically assigns a watermark level setting, that corresponds to current power requirements of APU 100, to real-time watermark registers 126.

APU 100 also implements various system monitoring and power management events. In particular, one system monitoring function is thermal monitoring. For example, if APU 100 becomes hot, then SMU 108 can reduce the frequency and voltage of CPU cores 122 and 124 and/or real-time clients 130. If APU 100 becomes too hot, then it can be shut down entirely. Thermal events can also be received from external sensors by SMU 108 via the SMN bus, and SMU 108 can reduce the clock frequency and/or power supply voltage in response.

Figure 2:
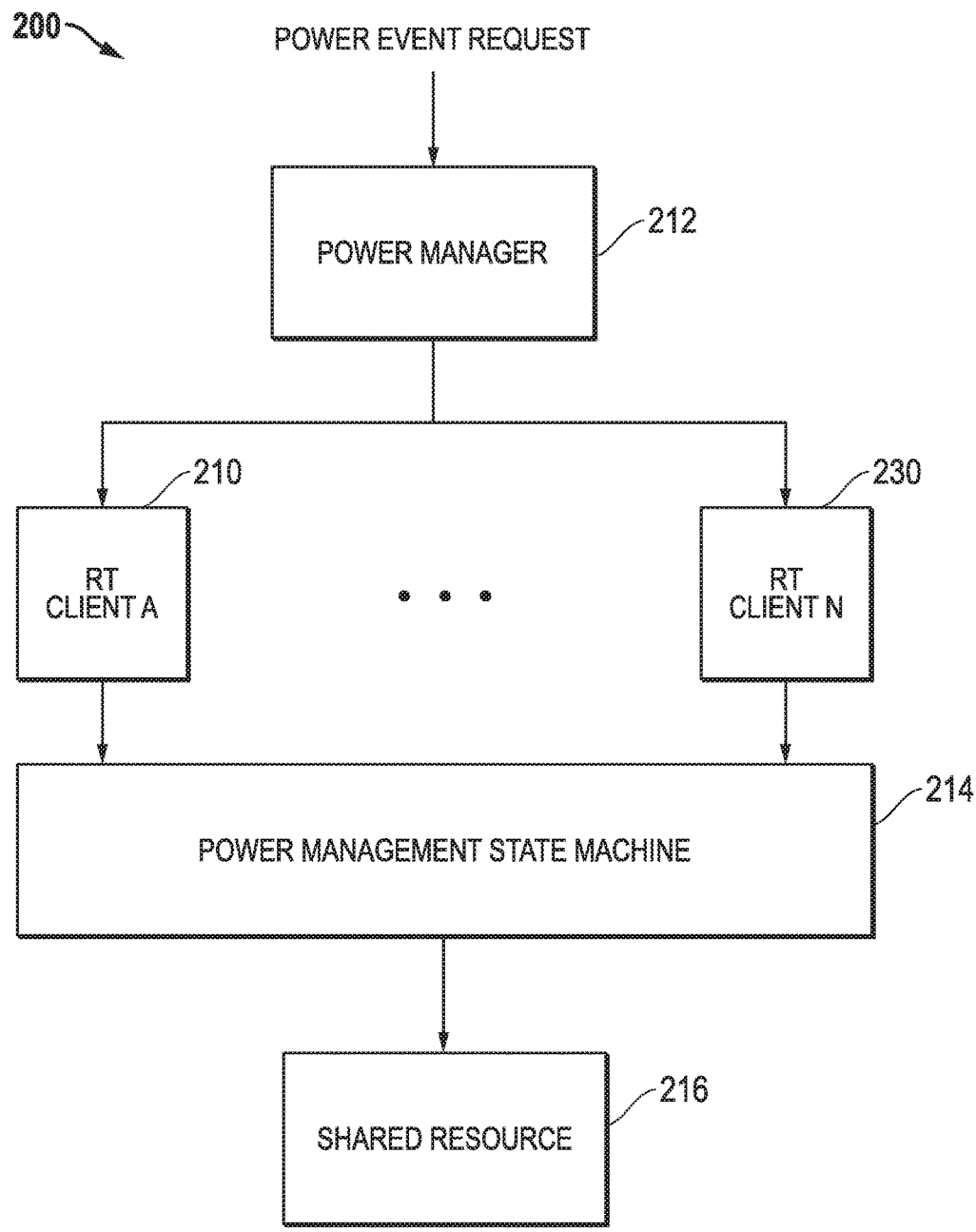
FIG. 2 illustrates in block diagram form a power management system for distributing a power event request according to some embodiments.

FIG. 2 illustrates in block diagram form a power management system for distributing power event request. Power management system 200 includes power manager 212, real-time client A 210, real-time client N 230, power management state machine 214, and shared resource 216.

Power manager 212 has an output connected to each real-time client of a plurality of real-time clients and has an input for receiving power event requests associated with the real-time clients.

Real-time client A 210 and real-time client N 230 are representative of a plurality of real-time clients. Real-time client A 210 and real-time client N 230 may be, for example a display controller, an image signal processor/controller, a USB controller, a camera controller, or a multi-media controller. Each real-time client has an associated read and/or write client buffer, a register for storing a watermark threshold for the client buffer, and logic for providing an allow signal when a number of valid entries in the client buffer exceed the watermark threshold.

Power management state machine 214 has an input connected to the plurality of real-time clients (real-time client A 210 and real-time client N 230) and an output connected to shared resource 216. Shared resource 216 may be for instance, the memory interface (double data rate physical interface).

In operation, power manager 212 receives a power event request. The power event request causes an interruption to the power consumed by APU 100. For instance, the power event request may be a request for one or more shared resources to enter a low power state or to place external memory components in low power states. Power manager 212 provides the depth of the power event request to the plurality of real-time clients (210 and 230). The depth of the power event corresponds to an amount of time the power event will last. Each real-time client, associated with the power event request, dynamically configures a watermark register value corresponding to the depth of the power event. The real-time client compares a number of entries in a client buffer associated with the watermark register to a value of the watermark register to determine if the power event request is an allowable request. In response to each real-time client (210 and 230) of the plurality of real-time clients determining the power event request is an allowable request, an allow signal is asserted to power management state machine 214. In this example, power management state machine 214, connected to shared resource 216, enables commencement of the power event. If, however, power management state machine 214 does not receive an allow signal from each real-time client associated with the power event request, power management state machine 214 does not allow the corresponding power event to commence.

Each real-time client (210 and 230) selectively sets the watermark threshold corresponding to the depth of the power event request, in response to the bandwidth requirement of the real-time client and the overall available system bandwidth. In one embodiment, the total system bandwidth is dynamically determined in part by a maximum system bandwidth, a total number of real-time and non-real-time clients, and interconnect topology. Each of the real-time clients provides an allow or non-allowance signal to power management state machine 214 based on current status of the buffer(s) of the real-time client with respect to the established watermark threshold. If the buffers are able to continue processing information throughout the duration of the power event, real-time client A 210 and real-time client N 230 assert the allow signal. If the selected watermark threshold corresponds to the buffer emptying (read) or filling (write) before the completion of the corresponding power event, the respective real-time client will not provide an allow signal to power state machine 214. Accordingly, power state machine 214 enables commencement of the power event when provided an allow signal from each real-time client associated with the power event request.

In another embodiment, power manager 212, in association with SMU 108 and power management firmware 112 (FIG. 1), enables the selection and setting of a watermark threshold in association with each active real-time client connected to APU 100. Power manager 212 and power management firmware 112 can be used collectively or separately to dynamically select the watermark threshold for each of the real-time clients. Alternatively, a separate hardware device interface can be used to set watermark settings per power event. Integrated between the controller of real-time clients 210 through 230 and power manager 212, the hardware device dynamically sets the watermark threshold according to the received power event request.

Processing watermark thresholds per real-time client and per power management event allows power management state machine 214 to uniquely handle each power management event without unnecessarily sacrificing resource bandwidth and/or causing undesirable latency.

Figure 3:
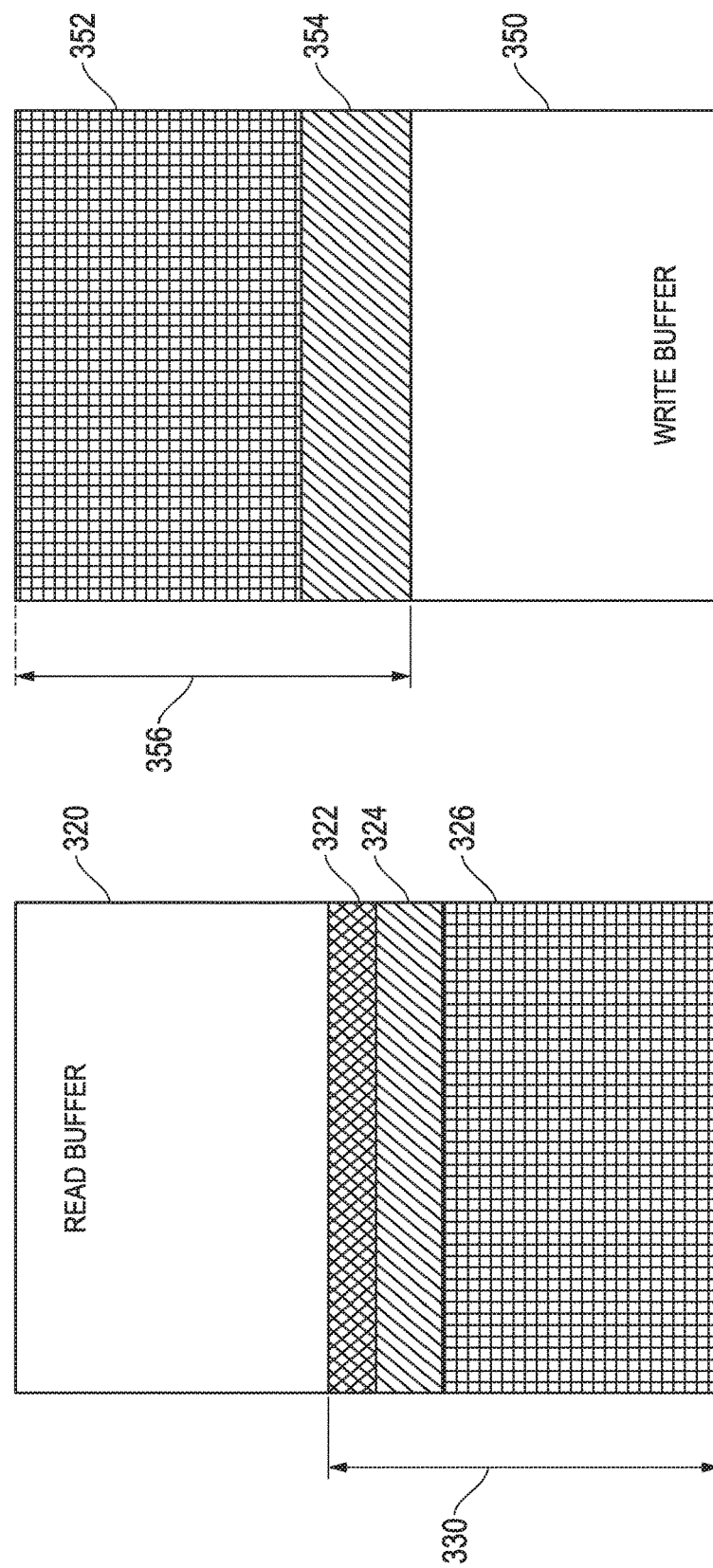
FIG. 3 illustrates in block diagram form a watermark threshold associated with a real-time client buffer according to some embodiments.

FIG. 3 illustrates in block diagram form a watermark threshold associated with a real-time client buffer according to some embodiments. FIG. 3 includes real-time write client buffer 320 and real-time read client buffer 350.

Read client buffer 320 includes read time to fill 322, read bandwidth ramp time 324, read event latency 326, and read watermark threshold 330. Read time to fill 322 associates with the period of time needed to occupy a predetermined guaranteed bandwidth in the read client buffer. Read bandwidth ramp time 324 is the amount of time associated with reaching the guaranteed read bandwidth. Read event latency 326 is the time associated with the duration of the power management event. Read watermark threshold 330 defines the time when a power event will commence. Read watermark threshold 330 is derived from the summation of time to fill 322, Read bandwidth ramp time 324, and read event latency 326, defines the maximum amount of time read client buffer 320 can operate before the power management event would cause read client buffer 320 to underflow; thereby creating an interruption in the quality of service provided by the real-time client.

Write client buffer 350 includes write event latency 352, write time to ramp 354, and write watermark threshold 356. Write event latency 352 is the amount of time that the write client buffer requires to reach the guaranteed write bandwidth needed during the power management event. Write time to ramp 354 is the amount of time associated with reaching the guaranteed write bandwidth. Write watermark threshold 356, derived from the summation of write event latency 352 and write time to ramp 354, defines the maximum time write client buffer 350 can operate, with respect to the available bandwidth, before commencement of the power management event would cause write client buffer 350 to overflow, requiring the use of the shared resource associated with the power management event.

In operation, a plurality of clients is coupled to the power manager. Each real-time client includes at least one client buffer that has a plurality of entries for storing data, and a register associated with each client buffer for storing a watermark threshold for the real-time client. The watermark register of read client buffer 320 and write client buffer 350 are dynamically configured by the respective real-time client to correlate to an available bandwidth capacity for each of the plurality of real-time clients in correspondence to the depth of the power event. Client buffers (320 and 350) are provided a watermark register for each power management event. Read watermark threshold 330 is dynamically configured to ensure read client buffer 320 does not underflow with available entries to read to memory during the assessed power management event of the read real time client. Write watermark register 356 is dynamically configured to ensure that write client buffer 350 does not overflow with entries to write to memory during the assessed power management event of the write real time client. Logic associated with the respective client buffer provides a signal to the power management state machine based on the status of entries in the client buffers.

For example, if entries in read client buffer 320 meet and/or exceed the provided watermark threshold (will not cause the buffer to underflow), logic associated with read client buffer 320 provides an allow signal to the power management state machine. Therefore, in response to read client buffer 320 having enough data to avoid draining read client buffer 320 below the watermark threshold for the duration of the power event, the real-time read client provides the allow signal to the power management state machine in an inactive state.

In another example, if entries in write client buffer 350 will not exceed the provided watermark threshold (will not cause the buffer to overflow), logic associated with write client buffer 350 provides an allow signal to the power management state machine. Therefore, the real-time client sets write watermark threshold 356 of write client buffer 350 based on a time to overflow corresponding to the power event depth signal. In response to write client buffer 350 filling below the watermark threshold for the duration of the power event, a real-time write client provides the allow signal in an inactive state.

In one example, for each real-time client a watermark register is added per instance and per power management event for a SoC. The SoC includes four displays, two cameras, and four USB ports. A watermark register is added for each real-time client. Four read watermark registers are added for the display controller. Two write watermark registers are added for the camera controller. Four write watermark registers are added for the USBs. In one embodiment, separate watermark registers are added per power management event (or memory retraining event). Each client detects the status of their respective watermark threshold(s), and provides an allowance signal or non-allowance signal to the power management state machine in correspondence to each buffer's ability to operate through the power management event. The power management state machine must confirm a watermark allow status from each real-time client before committing to the power management or memory retraining event.

Read watermark threshold 330 and write watermark threshold 356 define the recommended buffer level for the real-time client to maintain quality service during the power management event. By providing a watermark register to the buffer of each real-time client and dynamically setting the watermark threshold prior to a power management event, the power manager is able to ensure improved quality of service for the SoC. Watermark thresholds per buffer, per power management event provides a process for ensuring that a write client buffer does not overflow and a read client buffer does not underflow during the power management event and/or memory retraining event.

Figure 4:
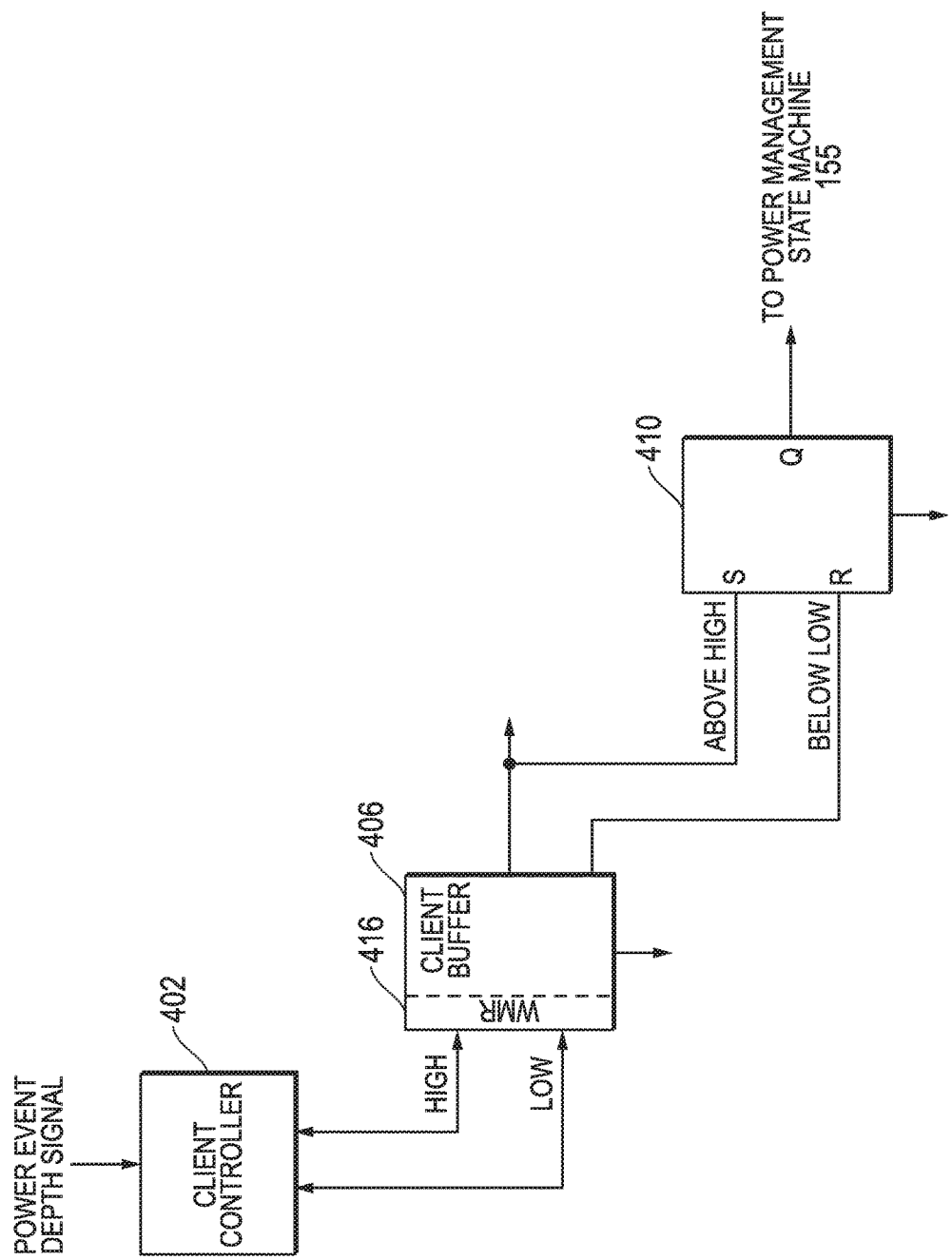
FIG. 4 illustrates in block diagram form a real-time client and associated latch system suitable for use in the APU of FIG. 1 according to some embodiments.

FIG. 4 illustrates in block diagram form a real-time client and associated latch system suitable for use in the APU of FIG. 1 according to some embodiments. FIG. 4 includes generally client controller 402, client buffer 406, and latch 410.

Client controller 402 has an input for receiving the power management event depth. Client controller 402 connects to client buffer 406, providing a high and a low signal to client buffer 406 respective of the power management event depth. Client controller can be for instance, a display controller, camera controller, USB controller, multi-media controller, etc.

Client buffer 406 includes watermark register 416. Watermark register 416 receives a high and a low threshold from client controller 402. Watermark register 416 defines a buffer bandwidth capacity for enduring the power event or retraining event. Client buffer 406 provides a first output to power management state machine 155 and a second output.

Latch 410 receives a first input and a second input from client buffer 406. Latch 410 provides an ALLOW signal to power management state machine 155. Latch 410 is a set-reset latch and provides the ALLOW signal in an active state at a logic high when set, and in an inactive state at a logic low when reset.

In operation, client controller 402 receives the power event depth signal. The power event depth signal is partially determined by a calculated consumption of bandwidth capacity for a client buffer 406 associated with the power event request. The power event depth signal allows client controller 402 to determine the time duration of the detected power management event, and thereby the number of buffer entries required to sustain operations during the power management event without stalling. Watermark register 416 is provided a high and a low watermark threshold for each power event request. Latch 410 returns the ALLOW signal to power state machine 155 until watermark register 416 detects one of a below low signal and above high signal for corresponding client buffer. In this way, latch 410 continuously provides the status of client buffer 406 to power management state machine 155.

For example, client controller 402 determines how many buffer entries are needed (in the case of a read client buffer) or how many free entries need to be available (in the case of a write client buffer) so that the associated real-time client does not experience an interruption in the service provided by the APU during the power event. The deeper the power management event, the longer the exit latency, and thereby the more entries are needed (receive buffer) or need to be available (write client buffer) by the client buffer to sustain the depth of the power management event. Each client controller dynamically selects the watermark threshold for itself in response to the power event depth signal. When client buffer 406 receives the power management event, real-time client controller 402 compares the respective watermark register to the current status of the client buffer. If the buffer is one of ABOVE HIGH and BELOW LOW the respective watermark thresholds, the allow signal is rescinded, triggering transition of at least one shared resource from a low power state to a high power state. Otherwise, latch 410 continues to provide the ALLOW signal to power management state machine 155.

In the exemplary embodiment of FIG. 4, the ALLOW signal is provided by latch 410 to power management state machine 155. The high and low watermarks correspond to client buffer being near one of full and empty. When the real-time client detects a low watermark threshold capacity, latch 410 enables the power management state machine to disable the allow signal, triggering transition of a shared resource from a low power state to a high power state. The high and low watermarks in conjunction with latch 410 provide hysteresis between client buffer 406 and latch 410 for reliably providing the ALLOW signal while the buffer is being dynamically drained and filled.

Figure 5:
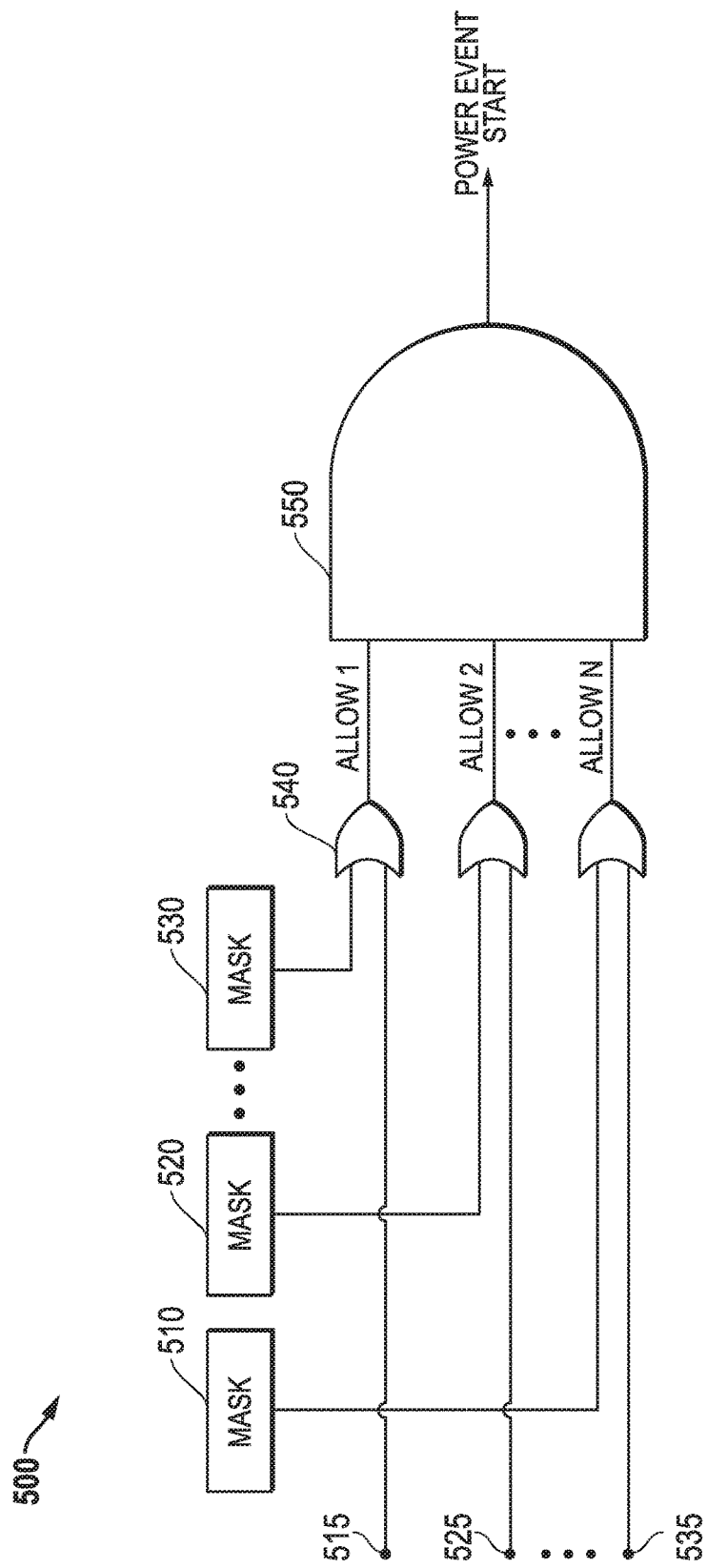
FIG. 5 illustrates in partial block diagram and partial circuit form a power management state machine suitable for use in the APU of FIG. 1 according to some embodiments.

FIG. 5 illustrates in partial block diagram and partial circuit form a power management state machine suitable for use in the APU of FIG. 1 according to some embodiments. Power management state machine 500 includes real-time client signal 515, real-time client signal 525, real-time client signal 535, mask signal 510, mask signal 520, mask signal 530, a set of OR gates 540, and an AND logic gate 550.

Interconnect 150 includes power management state machine 500. Each real-time client of a plurality of real-time clients is connected to AND logic gate 550.

Power manager 212 provides mask signals 510, 520, and 530 in an active state for respective real-time clients. Mask signals 510, 520, and 530 correspond to a value of the real-time client when the real-time client is not linked to the shared resources that are associated with a corresponding power management event (or memory retraining event) for the current use-case.

In operation, mask signals 510, 520, and 530 correspond to a value of an allotment of shared resources associated with the real-time client for a duration of the power event request. For example, the mask signal corresponds to a value of an allotment of shared resources associated with the real-time client for a duration of the power event request. Therefore, if the mask signal is high, the corresponding ALLOW signal is high (because the real-time client is a "don't-care" for the corresponding power event. If the mask signal 510, 520, and/or 530 is low to the respective OR gate 540, the output depends on the state of the ALLOW signal sent by comparing the state of the real-time buffer to the watermark threshold. To provide the POWER EVENT START signal, all unmasked real time clients must report the ALLOW condition to AND gate 550. The ALLOW signal is provided as at least one of a wire signal and a virtual wire signal.

In one embodiment, mask signals 510, 520, and 530 are implemented as a weight factor or value. The weight factor selectively prioritizes a power consumption allotment per real-time client for the power event request signal. Implementing the weight factor enables the power manager state machine to prioritize the significance of real-time client's allowance or non-allowance signal (or absence of an allow signal).

In another embodiment, the power manager masks the real-time client buffer when the real-time client buffer is not associated with the power event request signal. The power manager enables mask signals 510, 520, and 530 to mask allow signals for one or more real-time clients, and in response to an asserted masked allow signal, the power management state machine bypasses a response from the real-time client for the corresponding power event request. Therefore, the power management state machine enables commencement of the power event in response to receiving the allow signal from all enabled real-time clients that are providing real time client signals 515, 525, and 535.

Figure 6:
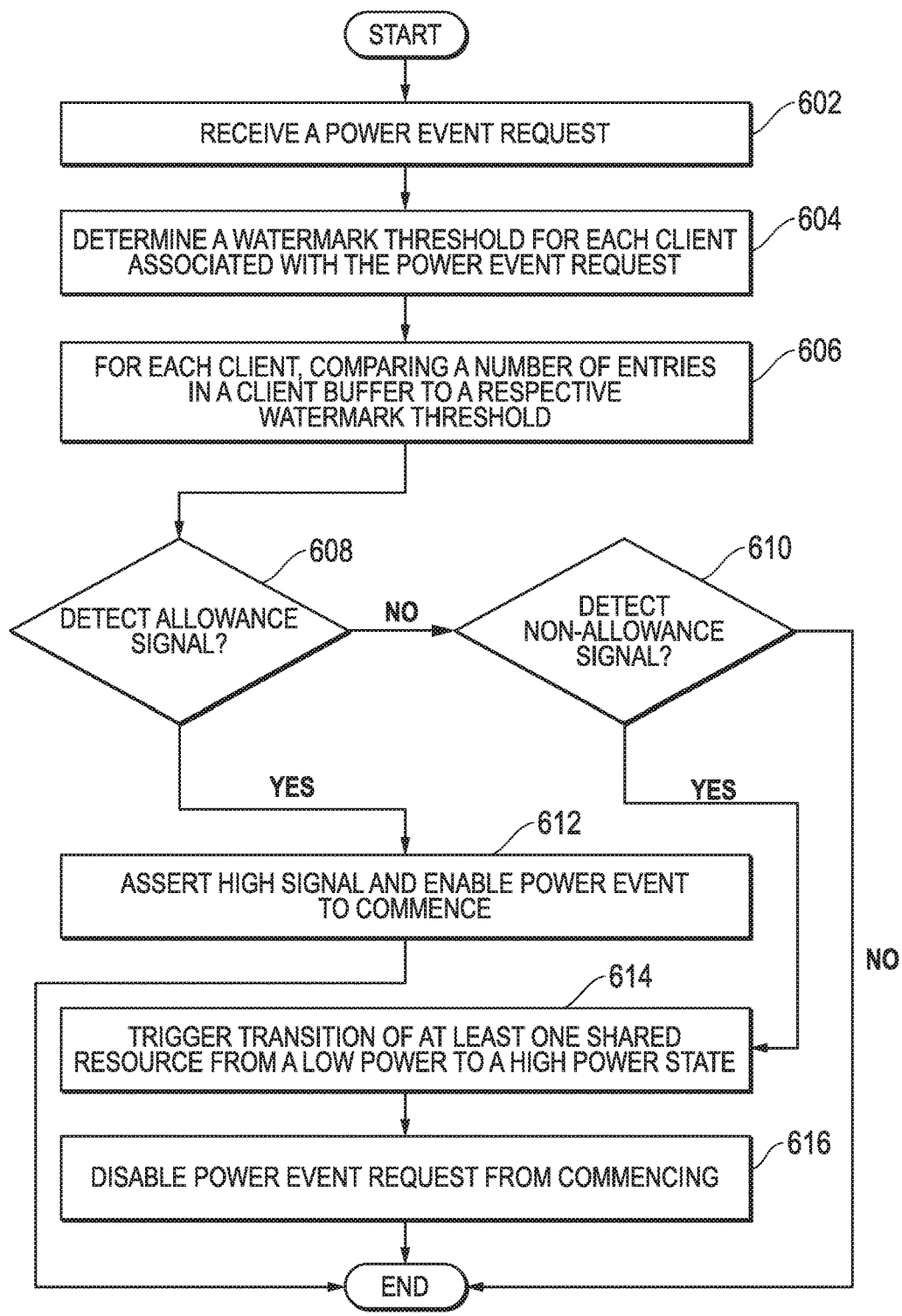
FIG. 6 illustrates a flow diagram that may be used by the power management state machine of FIG. 5 according to some embodiments.

FIG. 6 illustrates a flow diagram of method 600 that may be used by the power management state machine of FIG. 5. At block 602, power manager receives a power event request. Power manager determines a watermark threshold for each client associated with the power event request at block 604. At block 606, for each client, the number of entries in the client buffer is compared to a respective watermark threshold (associated with the watermark register) to determine if the power event can continue to be allowed. At block 608 a determination is made whether the power management state machine detects an allowance signal. If the power management state machine detects an allowance signal the process continues to block 612. If the power management state machine does not detect an allowance signal the process continues to block 610. At block 610 a determination is made whether the power management state machine detects a non-allowance signal. If the power management state machine does not detect a non-allowance signal, the process ends. If the power management state machine does detect a non-allowance signal, the process continues to block 614. At block 612 the power management state machine asserts a high signal and enables the power management state machine to commence. In response to the detecting a non-allowance signal, at block 614 the power management state machine triggers transition of at least one shared resource from a low power state to a high-power state. The power manager disables the power event request at block 616 from commencing. The process concludes at the end block.

APU 100 or any of its components may be implemented with various combinations of hardware and software. Some or all of these components or the method illustrated in FIG. 6 may be governed by instructions that are stored in a computer readable storage medium and that are executed by at least one processor. Each of the operations shown in FIG. 6 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, APU 100 of FIG. 1 or any portion thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. Memory controller 500 may interface to other types of memory besides DDRx memory, such as high bandwidth memory (HBM), RAMbus DRAM (RDRAM), and the like.

Accordingly, it is intended by the appended claims to cover all modifications of the disclosed embodiments that fall within the scope of the disclosed embodiments.

What is claimed is:

1. A data processing system, comprising:
   a power manager for providing a power event depth signal in response to a power event request signal, wherein the power event depth signal corresponds to an amount of time a power event will last;
   a plurality of real-time clients coupled to the power manager, each real-time client comprising:
      a client buffer having a plurality of entries for storing data;
      a client controller for providing a watermark threshold in response to the power event depth signal, each real-time client comparing a number of entries in the client buffer with the watermark threshold; and
      logic for providing an allow signal in response to the client controller comparing the number of entries in the client buffer with the watermark threshold, and
   a power management state machine coupled to each of the plurality of real-time clients, for providing a power event start signal to a shared resource in response to all of the plurality of real-time clients providing respective allow signals.

2. The data processing system of claim 1, further comprising a register for storing the watermark threshold for the client buffer, wherein the register dynamically configures a bandwidth capacity for each of the plurality of real-time clients in correspondence to the power event depth signal.

3. The data processing system of claim 2, wherein the register defines a buffer bandwidth capacity for enduring one of a retraining event and the power event request signal.

4. The data processing system of claim 1, wherein the power management state machine receives an allow signal, and in response to receiving the allow signal, the power management state machine outputs a power event signal in an active state.

5. The data processing system of claim 1, wherein each real-time client withholds an allow signal, and in response to an absence of the allow signal, the power management state machine withholds a power event signal in an active state.

6. The data processing system of claim 1, wherein each real-time client masks the allow signal, and in response to a masked allow signal, the power management state machine bypasses a response from the real-time client for the power event request signal.

7. The data processing system of claim 1, wherein the power manager receives a weight factor, and in response to receiving the weight factor, selectively prioritizes a power consumption allotment per real-time client for the power event request signal.

8. The data processing system of claim 1, wherein a client controller selects the watermark threshold for all of the plurality of real-time clients in response to the power event depth signal.

9. The data processing system of claim 1, wherein the power event depth signal is partially determined by a calculated consumption of bandwidth capacity for a client buffer associated with the power event request signal.

10. The data processing system of claim 1, wherein the power manager sets the watermark threshold for each of the plurality of real-time clients based on a respective bandwidth requirement.

11. The data processing system of claim 1, wherein the power manager sets the watermark threshold for each of the plurality of real-time clients in response to an available system bandwidth.

12. The data processing system of claim 1, wherein a total system bandwidth is dynamically determined in part by a maximum system bandwidth, a total number of real-time and non-real-time clients, and interconnect topology.

13. The data processing system of claim 1, wherein:
the power manager sets the watermark threshold of a read client buffer, based on a time to underflow corresponding to the power event depth signal; and
in response to the read client buffer draining below the watermark threshold, a read client provides the allow signal in an inactive state.

14. The data processing system of claim 1, wherein:
the power manager sets the watermark threshold of a write client buffer based on a time to overflow corresponding to the power event depth signal; and
in response to the write client buffer filling below the watermark threshold, a write client provides the allow signal in an inactive state.

15. The data processing system of claim 1, wherein in response to one of the plurality of real-time clients detecting a low watermark threshold capacity, the power management state machine disables the allow signal, and triggers a transition of a shared resource from a low power state to a high-power state.

16. The data processing system of claim 1, wherein the power manager masks the client buffer when the client buffer is not associated with the power event request signal.

17. A data processing system, comprising:
a power management state machine;
a power manager coupled to the power management state machine for receiving a power event request;
a plurality of real-time clients coupled to the power management state machine and to the power manager for receiving a depth of a power event, wherein the depth of the power event corresponds to an amount of time the power event will last, and adapted to:
dynamically configure a bandwidth of a watermark register in correspondence to the depth of the power event;
compare a number of entries in a client buffer associated with the watermark register to a value of the watermark register;
determine if the power event request is an allowable request; and
in response to determining the power event request is an allowable request, assert an allow signal to enable commencement of the power event.

18. The data processing system of claim 17, wherein the power manager provides a mask value for each of the plurality of real-time clients to the power management state machine.

19. The data processing system of claim 18, wherein the mask value corresponds to a value of an allotment of shared resources associated with each of the plurality of real-time clients for a duration of the power event request.

20. The data processing system of claim 18, wherein the power management state machine enables commencement of the power event in response to receiving the allow signal and the mask value from each of the plurality of real-time clients.

21. The data processing system of claim 18, wherein the power management state machine enables commencement of the power event in response to receiving the allow signal from all enabled real-time clients.

22. The data processing system of claim 17, wherein the power management state machine receives a buffer status from each real-time client.

23. The data processing system of claim 17, wherein each real-time client is associated with a respective watermark register.

24. The data processing system of claim 17, wherein each real-time client is coupled to at least one shared resource.

25. A method for dynamically managing clients during real-time power events for shared resources, the method comprising:
receiving a power event request;
determining a watermark threshold for each client associated with the power event request;
for each client, comparing a number of entries in a client buffer to a respective watermark threshold;
detecting at least one of an allowance signal and a non-allowance signal in response to the comparing for each client;
in response to detecting an allowance signal from each client associated with the power event request, enabling a power event to commence; and
in response to detecting at least one non-allowance signal from at least one client associated with the power event request, disabling the power event from commencing.

26. The method of claim 25, further comprising:
dynamically determining the watermark threshold in response to a power event depth of the power event request, wherein the power event depth is associated with exit latencies of the shared resources from low to high power states; and
updating the watermark threshold for a subsequent power event request associated with a client buffer.

27. The method of claim 25, wherein a power manager determines when an allowance signal, non-allowance signal, and a mask are associated with a client per power event.

28. The method of claim 27, wherein the mask is returned when a specified client is not associated with a shared resource of a corresponding power event.

29. The method of claim 25, further comprising:
dynamically determining a watermark threshold of a read client buffer, wherein the watermark threshold of the read client buffer is a time to underflow corresponding to a power event depth; and in response to the read client buffer draining below the watermark threshold, asserting an allow signal in an inactive state.

30. The method of claim 25, further comprising:

dynamically determining a watermark threshold of a write client buffer, wherein the watermark threshold of the write client buffer is a time to overflow corresponding to a power event depth; and in response to detecting the write client buffer is filled below the watermark threshold, asserting an allow signal in an inactive state.

31. The method of claim 25, further comprising enabling the power event in response to receiving an allow signal from each watermark register of a plurality of watermark registers associated with an unmasked client.

* * * * *